United States Patent

[11] 3,592,482

| [72] | Inventors | Bernard R. Better<br>Chicago;<br>Joseph W. Kosinski, Riverside, both of, Ill. |
|---|---|---|
| [21] | Appl. No. | 732,408 |
| [22] | Filed | May 27, 1968 |
| [45] | Patented | July 13, 1971 |
| [73] | Assignee | Scully-Jones Company<br>Chicago, Ill. |

[54] HYDRAULIC CHUCK
12 Claims, 8 Drawing Figs.

[52] U.S. Cl. ................................................. 279/4
[51] Int. Cl. ........................................... B23b 31/30
[50] Field of Search ........................................ 279/1 S, 1 D, 4

[56] References Cited
UNITED STATES PATENTS
3,388,917 6/1968 Winnen et al. ............... 279/4

Primary Examiner—Robert C. Riordon
Assistant Examiner—Donald D. Evenson
Attorneys—Eugene C. Goodale and Plante, Hartz, Smith & Thompson ABSTRACT: A hydraulic type chuck or holder for receiving and driving a lobed shank of a tool or other operated part, the chuck having a sleeve which has a straight passage of lobed configuration and which is so formed as to have annularly spaced thick wall portions alternating with annularly spaced thinner deformable portions which can be expanded into gripping and centering engagement with the driven shank when fluid pressure is applied to fluid pressure chambers defined in part by the outer side of the shell.

PATENTED JUL 13 1971  3,592,482

INVENTORS
BERNARD R. BETTER
JOSEPH W. KOSINSKI

BY
Eugene C. [signature]

ATTORNEY

*INVENTORS*
BERNARD R. BETTER
JOSEPH W. KOSINSKI

BY

*ATTORNEY*

3,592,482

HYDRAULIC CHUCK

BACKGROUND OF THE INVENTION

This invention pertains to tool chucks and more particularly to a hydraulically controlled tool chuck adapted to receive noncircular tool spindles.

Hydraulic tool or workholding chucks have been known for either the internal or external holding of tools or work parts, in which the tools or work parts are gripped by the application of fluid pressure applied to a shell within which the shank of the driven part is held. Conventional devices have used a thin walled cylindrical shell which can be expanded by sealed internal hydraulic pressure. The shell was fixed in a rigid chuck or driver adapted for operation for example as by a machine tool. One form of such a hydraulic tool holding device is shown in Drantz U.S. Pat. No. 3,133,740.

Hydraulic type holders of the character mentioned have been arranged to cooperate with a cylindrical shank on the tool and the driving engagement between the contractile shell and the shank of the tool has been a cylindrical surface of engagement between those parts when the shell is contracted into driving contact with the shank. This gives a nonpositive type of a rotational drive and although it permits convenient application and withdrawal and replacement of the tools, it does not give a definite or positive fixing of the relationship between the tool and the chuck in a rotational direction.

The use of tools having a shank portion, the cross-sectional shape of which is a rounded, three-lobed configuration, is not new but they have been used in chucks in which the centering of the tool is entirely mechanical. So far as is known the use of these so-called polygon shanks in a chuck arranged for hydraulic clamping with quick changing and presetting of tools and with hydraulic centering of the axis of the driven shank has not been used prior to the present invention.

SUMMARY OF THE INVENTION

This invention provides a hydraulically controlled tool chuck adapted to detachably receive tool spindles or the like having noncircular, cross-sectional configuration. In the illustrative embodiment shown, the cross-sectional shape is a three-sided polygon with roundish lobes. Such a spindle will be positively driven by the tool holding part of the chuck into which it telescopically fits since the axial passage in that part will be correspondingly contoured to fit the contour of the driven spindle.

The tool holding part of the chuck or body that receives the driven shank is a sleeve secured to the chuck body at one end of the sleeve, with a nontapered axial passage for slidably receiving the shank of a selected tool, the sleeve having a number of annularly spaced thick wall portions alternating with annularly spaced thinner deformable portions which can be expanded into gripping and centering engagement with the driven shank when fluid pressure is applied to pressure chambers arranged between the sleeve and the chuck body. These chambers are preferably flatted or longitudinally grooved portions along the outer side of the sleeve corresponding in number to the lobes of the sleeve passage. Fluid pressure is supplied to these fluid pressure chambers, which intercommunicate through a suitable pressure source which is herein shown as an adjustable piston that can be set by the operator to control the fluid pressure when clamping the tool in the sleeve.

As herein provided, since there is a three-lobed configuration to the passage in the sleeve, there are three circumferentially spaced pressure chambers which clamp the thinner portions of the sleeve against the tool and grip the tool firmly in place while at the same time centering it since the lobed arrangement and the pressure chamber are symmetrically arranged with respect to the central axis. The lobe axes of the passage in the sleeve are offset rotationally forward in the direction of rotation with respect to the thinnest portions of the sleeve wall so that the driving forces applied by the chuck through the sleeve are applied through a comparatively thicker portion of the sleeve to the roundish lobes of the tool shank. The gripping force applied to the tool, however, is generally along the flatter portions of the lobe sides and results from the frictional engagement of the deflected sleeve portion with the shank which prevents the tool from pulling out. In addition, when torque is applied, wedging of the sleeve and tool occurs to prevent axial movement of the tool. The wedging also creates a greater gripping force.

Within the chuck or driving head is a stop that determines the maximum axial extent of travel of the tool when the tool is applied in the straight bore of the sleeve. Thus a number of different tools may be conveniently preset and applied selectively to project a definite predetermined distance from the end of the driving head.

Therefore there is provided in accordance with the principal object of this invention, a novel, quick-change, presettable tooling arrangement which offers accuracy in centering by means of hydraulics or fluid pressure while combining a positive drive through the use of a noncircular or lobe-shaped chuck bore and a correspondingly matting tool shank. This provides a very high degree of rigidity in the drive with a minimum of backlash and chatter when the tool is in a cut. Any clearance between the tool shank and the bore of the chuck, which is held to a minimum, is balanced between the three driving lobes and torque is positively transmitted to the tool shank in a symmetrical manner. The chuck can be used in any position driven by a suitable machine tool and the securing of the desired tool in the chuck is accomplished, in the illustrative embodiment, with a socket wrench operable to produce the desired clamping pressure in the hydraulic system. There is repeatable accuracy in centering the axis of the driven shaft with the axis of the chuck and there is a minimum of projection beyond the end of the chuck such as will assure rigidity, as well as increased gripping power and positive force application as well as quick and easy tool changing in accordance with the invention.

DESCRIPTION OF THE PREFERRED EMBODIMENT

Figure 1:
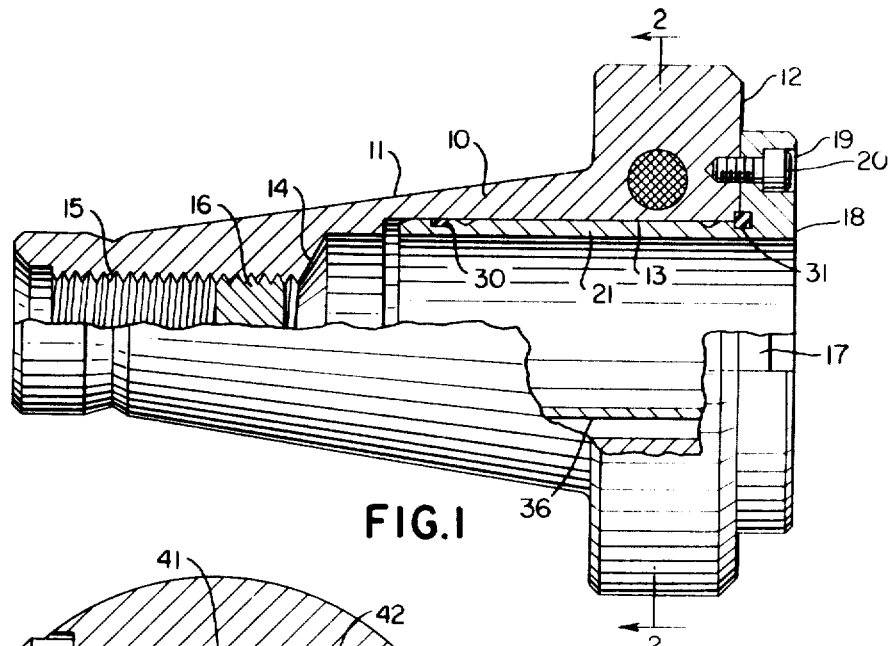
FIG. 1 is a side elevation of a driving chuck or head shown in partly in vertical central section.

In the embodiment chosen to illustrate this invention there is a chuck or body member 10 having a tapering outer surface 11 that can be received in a correspondingly tapered part of the machine tool that operates the chuck. At one end of the head there is a flange 12 and in the chuck or head is a cylindrical bore 13 extending part way through the head and terminating in a shaped passage 14, as an example, a conical shape is produced by a drill point, that extends to a tapped passage 15 in which a locating stop 16 against which the end of an inserted tool is adapted to abut to locate the tool endwise with respect to the chuck.

Arranged within the chuck or head is a sleeve 18 having an end flange 19 that is secured by means of attaching screws 20 to the flange 12 of the head. The flange 19 is integral with a sleeve portion 21 parts of which are cylindrically curved to fit within the bore 13 of the body. Both the flange 12 of the body and the flange 19 of the sleeve have a key slot snugly receiving a locating key 17 securely fixing the two parts against relative rotational movement.

Figure 2:
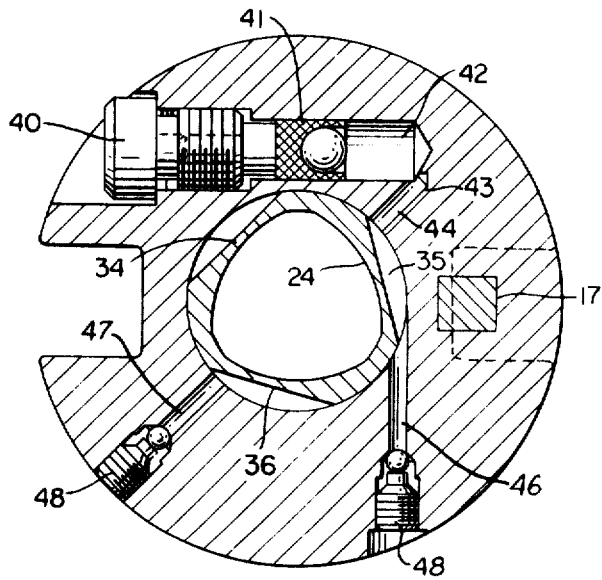
FIG. 2 is a section on line 2-2 of FIG. 1.
Figure 3:
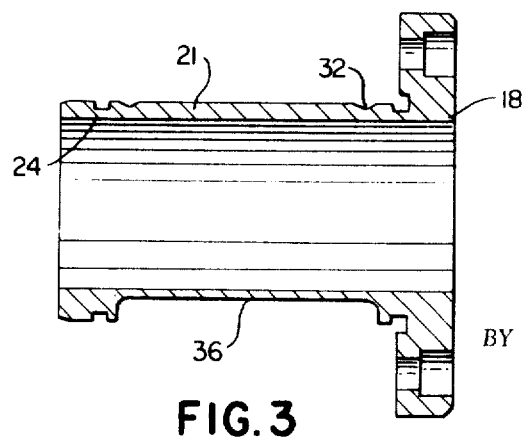
FIG. 3 is a central sectional view of the chuck sleeve taken on the line 3-3 of FIG. 2.
Figure 6:
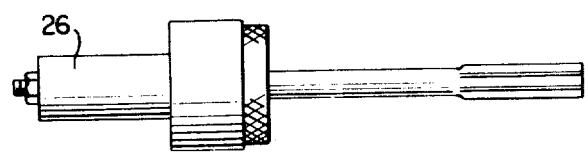
Figure 7:
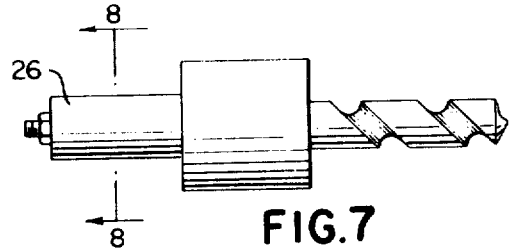
Figure 8:
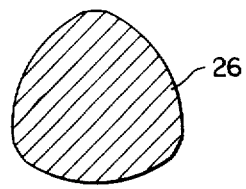
FIG. 8 is an enlarged sectional view through the shank of one of these tools taken on the line 8-8 of FIG. 7.

The sleeve contains a longitudinal straight passage 24 of noncircular cross-sectional shape adapted to interfit a correspondingly shaped noncircular shank of a driven member such as the tool shank. Such a tool shank is indicated at 26 in FIG. 6. The sectional configuration is such as to give a plurality of lobes symmetrical with respect to the central axis with roundish lobe portions as will be apparent from FIG. 2 of the drawing. Such a polygon shape lobe arrangement provides curved sides with roundish lobe ends and with three lobes it will be obvious that the lobe axes are arranged 120° apart. Until the walls of the sleeve are expanded inwardly by fluid pressure as will be presently described, these tool ends may be inserted into the passage in the sleeve freely but with a minimum of play such as would permit a snug slidable fit.

The sleeve near its end has O-ring grooves containing sealing O-rings 30 and 31 and at its cylindrically formed outer portion near the O-ring 31 is an annular groove 32 that places the fluid pressure chambers, which will be presently described, in communication with one another.

For a three-lobed polygon shape as illustrated there are three grooved or flatted portions on the outer side of the sleeve body between the O-rings 30 and 31. These flatted portions as indicated at 34, 35 and 36, provide pressure chambers at those locations and provide three annularly spaced comparatively thick wall portions alternating with three annularly spaced thinner deformable portions where the shell is of a reduced thickness to permit deformation or inward expansion or contraction into firm-gripping and centering engagement with the driven shank contained in the sleeve when fluid pressure is applied. This gripping action takes place principally adjacent the are between the roundish lobe ends of the driven shank and provide a firm grip while at the same time due to the symmetrical arrangement of the parts, there is a definite centering action with an elimination of all play between the shank and the sleeve.

Figure 4:
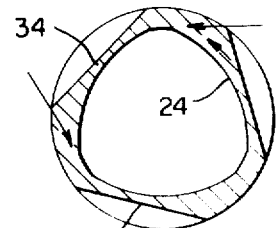
FIG. 4 is an enlarged sectional view showing the relationship between the fluid pressure chamber on the outer side of the sleeve and the lobes of the passage in the sleeve.
Figure 5:
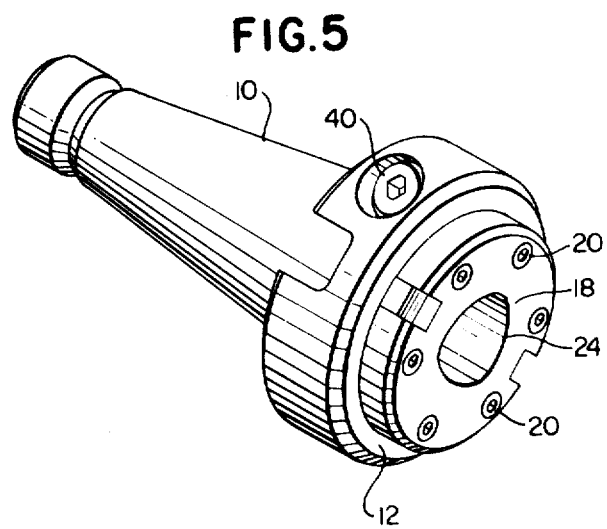
FIG. 5 is a perspective view of the chuck shown in FIG. 1, FIGS. 6 and 7 are side views of different tools that may be used with the chuck.

As will be apparent from FIG. 4, the locations of the three pressure chambers, 34, 35 and 36, are displaced backwardly (clockwise as shown) to the direction of rotation relatively to the lobe axis to give increased strength to those portions of the sleeve that apply the greatest turning force to the roundish lobed ends of the tool. These driving forces are shown by the straight arrows illustrated in FIG. 4 applied by the thicker portions of the sleeve because the lobe axes are not in correspondence with the locations of the gripping zones. Thus a firm gripping force is applied to the tool while at the same time there is a maximum strength provision for applying rotational driving force from the chuck to the tool.

The fluid pressure system may comprise a manually operated adjusting nut 40 that can be conveniently turned by the operator in one direction to force a piston 41 forwardly in the fluid pressure supply chamber 42 which is filled with suitable force-transmitting liquid. The chamber 42 is in communication by means of passage 44 with one of the chambers 35 on the outer side of the sleeve between the location of the O-rings 30 and 31. Passage 46 and 47 connect with the chambers 35 and 36 respectively and extend to operable closures 48 so that the supply of liquid can be easily replenished in the system. The groove 32 in the annularly extending circular portions of the sleeve place all of the chambers 34, 35 and 36 in communication with one another so that when pressure is applied to the system by moving the screw 40 and adjusting the piston 41 further into the chamber 42 there is a simultaneous clamping of all of the sides of the tool, centering the axis of the tool with respect to the sleeve and providing a firm gripping engagement between the sleeve and the tool.

While the illustrative embodiment has been shown using a three-lobed configuration, it is readily apparent that any number of lobes may be utilized.

Many advantages are offered by a system of this kind since operations such as drilling, reaming, end milling, shell milling and boring can now be performed in one location with the convenient tool replacement in definite predetermined positions. Single spindle milling and boring machines can give a multiple spindle range to provide fast, easy and safe tool changes with a positive drive for increased torque and resistance to pullout. The polygon-shaped tools can be inserted or removed from the spindle chuck quickly and easily by simply turning the actuated fluid pressure controlling screw. Presetting features built into the polygon adapters or tool permit the tools to be preset away from the machine and applied as desired.

While the form of apparatus herein described constitutes the preferred embodiment of the invention, it is to be understood that the invention is not limited to this precise form of apparatus and that changes may be made therein without departing from the scope of the invention which is defined in the appended claims.

What I claim is:

1. An expanding hydraulic type holder for an operated part comprising,
   a body having a central passage,
   a generally tubular shell having curved portions interfitting said passage,
   means for securing the shell to the body,
   said shell having a passage of irregular sectional contour, adapted to releasably receive and rotatably drive a noncircular contoured spindle of an operated part,
   said shell having annularly spaced thick wall portions alternating with annularly spaced thinner wall portions which are deformable by fluid pressure to grip the spindle of an operated part,
   and means for applying fluid pressure between the shell and the body to deform said shell.

2. An expanding hydraulic type holder as set forth in claim 1 having stop means for limiting the axial extent of insertion of a spingle.

3. An expanding hydraulic type holder as set forth in claim 1 in which the passage of the shell is of lobed form with roundish lobe ends.

4. An expanding hydraulic type holder as set forth in claim 1 in which the outer portions of the shell is formed to provide three annularly spaced pressure chambers between the shell and the holder body, with the thinnest portions of the shell at the locations of the pressure chambers.

5. An expanding hydraulic holder as set forth in claim 1 in which the bore of the body is a cylindrical bore interfitting cylindrical portions on the shell along the length of the shell,
   and in which the passage through the shell is a three-lobed passage with roundish lobed ends spaced 120° apart with respect to one another and in which the shell is longitudinally chambered at three gripping zones spaced apart at 120° with respect to one another but with the gripping zone annularly displaced with respect to the lobes so that pressure is applied to the spindle by a thicker portion of the shell against the roundish lobe ends of the spindle thereby.

6. An expanding holder for an operated part comprising,
   a hollow body having a cylindrical bore,
   a generally tubular shell having curved portions interfitting in said bore and having an end flange at an end of the holder,
   means fixing said flange to the end of the holder,
   said shell having a straight central passage of three-lobed configuration with roundish lobe ends adapted to releasably receive and rotatably drive a correspondingly contoured spindle of an operated part,
   stop means for limiting axial extent of insertion of a spindle into the shell,
   said shell having three annularly spaced thick wall portions receiving the three roundish lobe ends of the operated part,
   said thick wall portions alternating with annularly spaced thinner wall portions which are deformable to grip and center the spindle of the operated part, and means for expanding the thinner wall portions to grip and center the operated part.

7. A releasable holder for gripping a member comprising:
a sleeve member having a noncircular passage formed therein to receive said member and contoured to create a rotational connection therebetween;
fluid pressure means for applying fluid pressure to said sleeve to cause at least a portion of said passage to move to grip said member, whereby said member is retained by said fluid pressure means while being positively driven through said passage contours.

8. The holder of claim 7 wherein said fluid pressure means includes means causing a plurality of spaced passage portions symmetrically arranged about said passage to move to grip said member.

9. The holder of claim 7 wherein said fluid pressure means includes a body drivingly connected to said sleeve and further includes means forming at least one fluid pressure chamber defined by said body and a portion of said sleeve member exterior to said passage, and wherein said fluid pressure means also includes means for supplying fluid pressure to said chamber sufficient to cause said portion of said passage to deform into engagement with said member.

10. The holder of claim 9 wherein said means forming said at least one fluid pressure chamber forms a plurality of spaced fluid pressure chambers symmetrically arranged about said passage.

11. The holder of claim 7 wherein said passage and a portion of said member are contoured substantially as corresponding polygons.

12. The holder of claim 10 wherein said passage and a portion of said member are contoured substantially as corresponding polygons and wherein said fluid pressure chambers are substantially aligned with said polygon sides, and wherein said sleeve member has portions engaging said body substantially aligned with said polygon corners, whereby rotative drive between said sleeve and said member will be through said passage portions engaging said body.